United States Patent
Schütz

(10) Patent No.: US 9,527,719 B2
(45) Date of Patent: Dec. 27, 2016

(54) TAPPING FITTING FOR A TRANSPORT AND STORAGE CONTAINER FOR LIQUIDS AND TRANSPORT AND STORAGE CONTAINER WITH SUCH TAPPING FITTING

(71) Applicant: PROTECHNA S.A., Fribourg (CH)

(72) Inventor: Udo Schütz, Selters (DE)

(73) Assignee: PROTECHNA S.A., Fribourg (CH)

( * ) Notice: Subject to any disclaimer, the term of this patent is extended or adjusted under 35 U.S.C. 154(b) by 0 days.

(21) Appl. No.: 14/641,871

(22) Filed: Mar. 9, 2015

(65) Prior Publication Data

US 2015/0175402 A1 Jun. 25, 2015

Related U.S. Application Data

(62) Division of application No. 13/205,364, filed on Aug. 8, 2011, now Pat. No. 9,004,453.

(30) Foreign Application Priority Data

Aug. 13, 2010 (DE) .................. 10 2010 039 328

(51) Int. Cl.
*F16L 55/02* (2006.01)
*B67D 7/32* (2010.01)

(52) U.S. Cl.
CPC ............ *B67D 7/3236* (2013.01); *F16L 55/02* (2013.01); *Y10T 137/612* (2015.04)

(58) Field of Classification Search
CPC ... B67D 7/3236; B65D 2213/02; B65D 90/46; F16L 55/02

USPC .................. 251/368; 361/215, 220
See application file for complete search history.

(56) References Cited

U.S. PATENT DOCUMENTS

| 2,153,199 | A | * | 4/1939 | Miller | B60K 15/04 138/118 |
| 6,156,969 | A | * | 12/2000 | Schutz | B65D 77/0466 174/17 LF |
| 9,004,453 | B2 | * | 4/2015 | Schutz | B67D 7/3236 251/368 |
| 2003/0111465 | A1 | * | 6/2003 | Hamm | B65D 77/061 220/3.2 |
| 2007/0257224 | A1 | * | 11/2007 | Butruille | B67D 7/3236 251/304 |
| 2009/0001078 | A1 | * | 1/2009 | Cassina | B65D 25/42 220/88.1 |
| 2013/0027835 | A1 | * | 1/2013 | West | B67D 7/3236 361/216 |

* cited by examiner

*Primary Examiner* — William McCalister
*Assistant Examiner* — Ian Paquette
(74) *Attorney, Agent, or Firm* — McGlew and Tuttle, P.C.

(57) ABSTRACT

A tapping fitting, particularly a flap or ball cock, with a fitting housing made from plastic for connection to a drain spigot of a plastic container for liquids, particularly an interior container of a transport and storage container. The fitting housing is provided with a conductive device at least part of which is made from electrically conductive plastic for dissipating an electrostatic charge. The conductive device is the conductive device has an integrally conformed earthing conductor for the electrically conductive connection of the conductive device to a ground potential and is also connected integrally with the fitting housing.

17 Claims, 6 Drawing Sheets

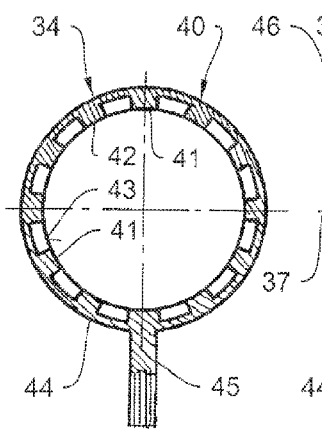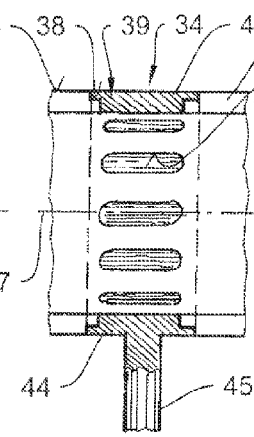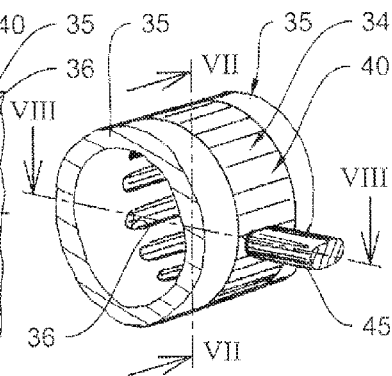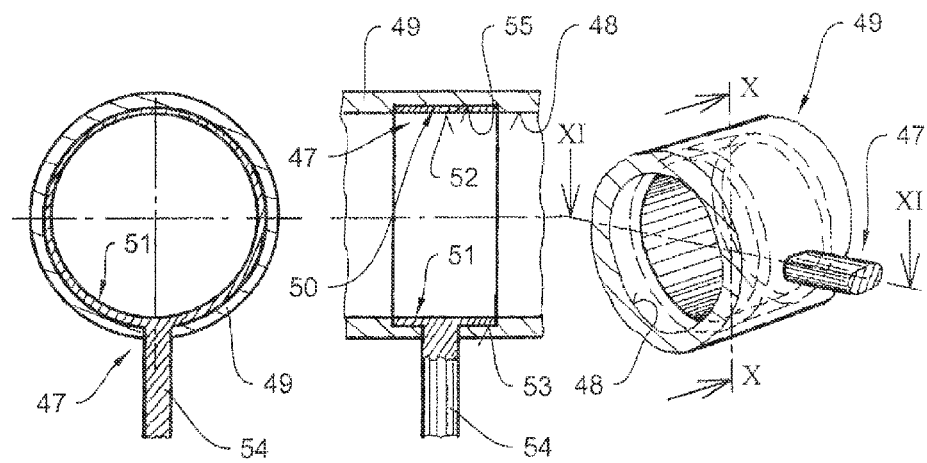

Fig. 13    Fig. 14    Fig. 12
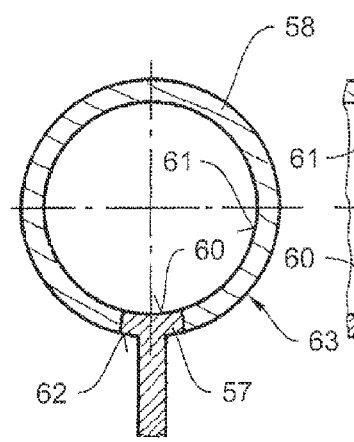 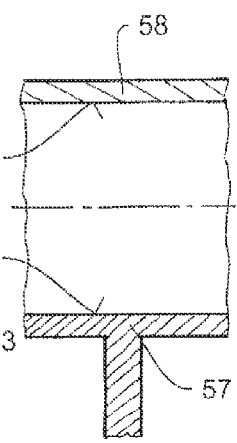 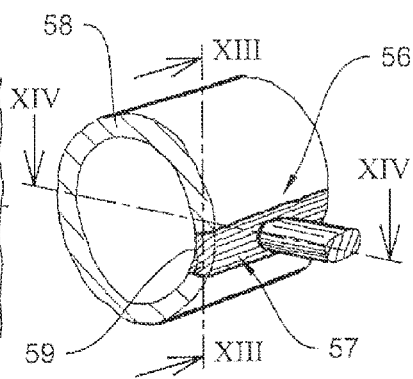
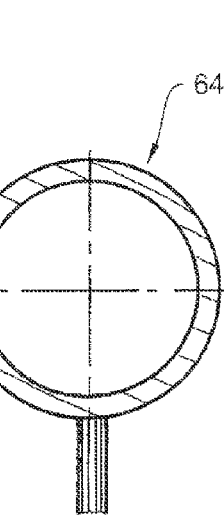 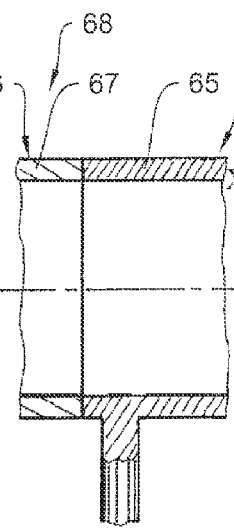 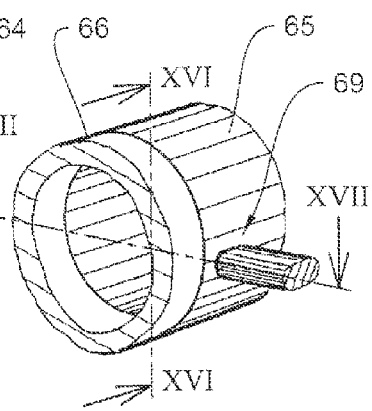
Fig. 16    Fig. 17    Fig. 15

Fig. 18
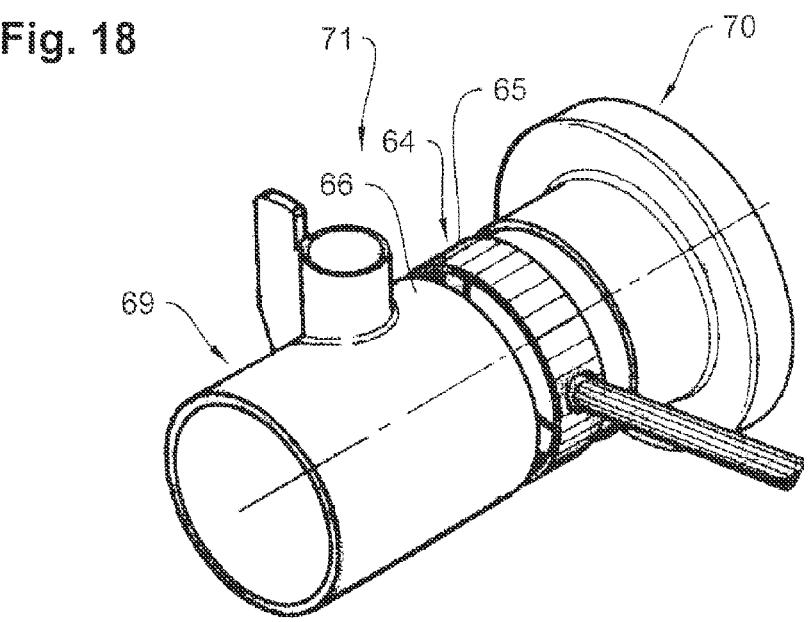
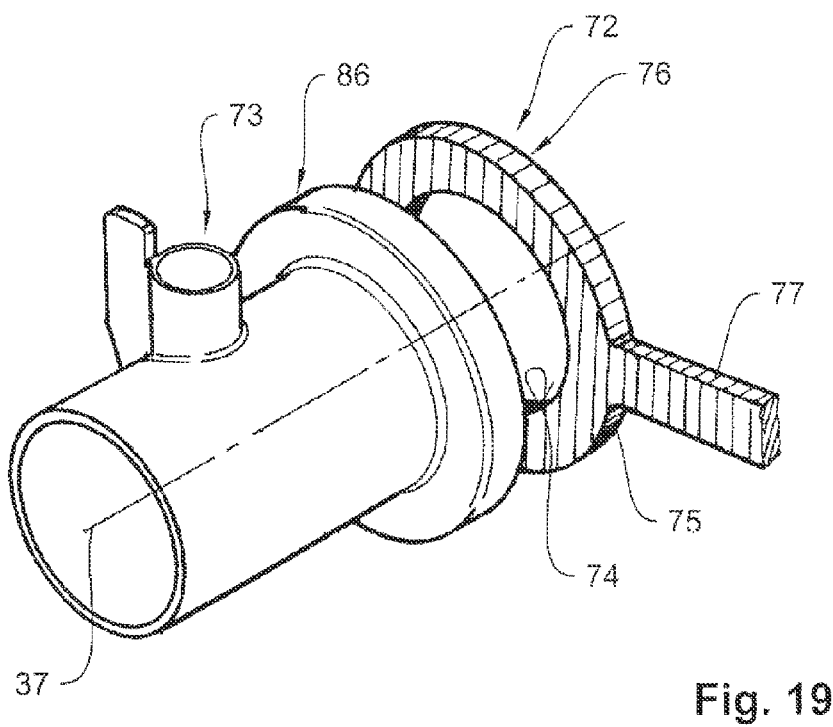
Fig. 19

TAPPING FITTING FOR A TRANSPORT AND STORAGE CONTAINER FOR LIQUIDS AND TRANSPORT AND STORAGE CONTAINER WITH SUCH TAPPING FITTING

CROSS REFERENCE TO RELATED APPLICATIONS

This application is a divisional under 37 CFR 1.53(b) of pending prior application Ser. No. 13/205,364 filed Aug. 8, 2011 and claims the benefit under 35 U.S.C. §119 of German Patent Application DE 10 2010 039 328.2 of Aug. 13, 2010, the entire contents of each application are incorporated herein by reference.

FIELD OF THE INVENTION

The present invention relates to a tapping fitting with a fitting housing made from plastic, particularly a flap or ball cock, for connection to a spigot of a plastic container for liquids, particularly an interior container of a transport and storage container, wherein the fitting housing is provided with a conductive device at least part of which is made from electrically conductive plastic for dissipating an electrostatic charge. The present invention further relates to a transport and storage container for liquids equipped with such a tapping fitting.

BACKGROUND OF THE INVENTION

Liquid containers made from plastic are often used as transport and storage containers for liquids that may contain explosive components or are capable of forming explosive or readily ignitable gases in the liquid container. When such liquid containers are filled or emptied, friction between the liquid and the mantle of the liquid container may cause the buildup of electrostatic charges, which may result in ignition of the liquid or of the gases formed by the liquid.

In order to ensure that such ignition cannot happen, it has been suggested in the related art to dissipate the electrostatic charge via suitable means on the liquid container and/or the tapping fitting. To this end, EP 2 008 946 A1 describes an arrangement of a tapping fitting on a container for liquids that is provided with a drain port in such manner that an insertable port made from electrically conductive plastic material is provided between the drain spigot and the tapping fitting, wherein the insertable port is inserted with a cylindrical portion between an inner wall of the drain spigot and an outer wall of a filling port of the tapping fitting and protrudes radially beyond the tapping fitting with a flange rim, so that a welded connection may be created between the drain spigot of the liquid container and the insertable port and also between the insertable port and the tapping fitting when the tapping fitting is attached. An electrical conductor designed without to be independent of the insertable port is provided to form an electrically conductive connection between the insertable port and a ground potential.

The arrangement known from EP 2 008 946 A1 requires appropriate handling of the insertable port while the tapping fitting is mounted on the drain spigot of the liquid container. Moreover, a material-consistent and thus highly conductive bond is created between the tapping fitting and the insertable port but only in the areas where the welded join has actually been made. Furthermore, the separately constructed electrical conductor has to be connected to the insertable port in an additional mounting step.

SUMMARY OF THE INVENTION

The task underlying the present invention is therefore to enable safe dissipation of an electrostatic charge from a tapping fitting which not only requires no additional effort for mounting the tapping fitting on the liquid container, but also enables the electrostatic charge to be dissipated particularly effectively. A further underlying task of the invention is to suggest a transport and storage container for liquids that provides a higher degree of operational safety.

In the tapping fitting according to the invention, the conductive device has an integrally constructed earthing conductor for electrically conductive connection of the conductive device to a ground potential. The conductive device is also connected integrally to the fitting housing.

Due to the integral connection between the conductive device and the fitting housing, it is no longer necessary to handle the conductive device separately when mounting or installing the tapping fitting on the liquid container. Moreover, the integral design prevents the formation of undesirable transition resistances between the conductive device and the fitting housing, which may occur if the connection between the conductive device and the fitting housing is created incorrectly or incompletely during installation. The integral design of the earthing conductor with the conductive device also ensures that undesirable transition resistances between the conductive device and the earthing conductor, which might impair the effectiveness of the dissipation of an electrostatic charge, cannot occur.

In a preferred embodiment, a segment body of the conductive device forms a wall segment of a channel wall that defines a flow channel in the fitting housing, with a contact surface of the segment body arranged so as to be exposed on the interior side of the channel wall, which segment body is arranged in an outer surface of the channel wall with a connection surface to which the earthing conductor is connected with a material consistent bond.

In this preferred embodiment, the conductive device is thus in direct contact with the liquid in the liquid container, thus ensuring particularly effective, direct dissipation of electrostatic charge from the liquid. Connecting the earthing conductor to the connection surface of the segment body in the outer surface of the channel wall ensures that a visual inspection of the effective electrical connection between the connection conductor and the segment body may easily be carried out at any time.

If, as in a further preferred embodiment, the conductive device has an annular segment body which is arranged in a channel wall in such manner that the connection surface is located on the outside of the channel wall and a plurality of contacting extensions disposed radially and forming the contact surface penetrate the channel wall, an electrostatic charge may be dissipated evenly around the circumference of the channel wall. In addition, the connection between the segment body and the channel wall is not only made in materially consistent manner but also in positive locking manner due to the conformation of the contacting extensions of the segment body that penetrate the channel wall.

In a further preferred embodiment, the conductive device has an annular segment body that is disposed in an annular recess in the channel wall, wherein the connection surface is located on a bottom of the recess and the earthing conductor passes through the channel wall to the outside.

In this embodiment, full contact is enabled between the liquid and the conductive device around the entire circumference of the channel wall. Despite this full contact, however, the outer appearance of the fitting housing is not affected by the segment body, so that the surface of the fitting housing remains neutral and even, and the whole of the surface of the fitting housing may be customized, for example the company using the liquid container may apply a design identifying the company.

A fitting housing equipped with a conductive device may be manufactured particularly easily if the conductive device and its segment body together form a section of the channel wall, so that the mold for manufacturing the fitting housing may be produced particularly easily in a "2K technology" process in which an injection molding machine is used. This applies particularly if the segment body is annular in shape.

If, as In a further embodiment, the segment body is realized as an intermediate element between two sections of the fitting housing, not only is a particularly effective design of the conductive device possible, but the earthing conductor, which is constructed integrally with the segment body, is located in a readily accessible area of the fitting housing, so that the earthing conductor may be connected to a ground potential very easily.

Alternatively, it is also possible to construct the segment body as a materially consistent extension of a contact terminal of the fitting housing, so that if necessary the conductive device may be located as closely as possible to the tapping spigot of the liquid container.

It is particularly advantageous if the extension also forms a connection flange for a welded connection of the fitting housing to the tapping spigot of the liquid container, so that the segment body serves a dual function, as an electrical dissipating element and a mechanical connector.

A particularly effective design of the conductive device is enabled if it includes a flow deflection body configured as an axial extension of the earthing conductor, which is disposed in the flow channel and perpendicularly to the lengthwise direction thereof formed by the channel wall so that it is fully exposed in a free flow cross section of the flow channel.

In this way, the conductive device is completely surrounded by the liquid in the liquid container, and when the liquid is tapped, it flows directly over the conductive device as it is poured out. In this context, it is particularly advantageous if the flow deflection body has a flow profile to ensure that the flow deflection device is covered by the liquid as thoroughly as possible.

The transport and storage container for liquids constructed according to the invention enables functionally reliable dissipation of an electrostatic charge due to the tapping fitting, which in turn ensures a higher degree of operating safety.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 6 is a view of another embodiment of a conductive device conformed in a filling port of a fitting housing;

FIG. 7 is a cross-sectional view of the conductive device of FIG. 6 along sectional line VII-VII;

FIG. 8 is a cross-sectional view of the conductive device of FIG. 6 along sectional line VIII-VIII;

FIG. 9 is a view of the filling port of a fitting housing with another embodiment of a conductive device;

FIG. 10 is a cross-sectional view of the conductive device of FIG. 9 along sectional line X-X;

FIG. 11 is a cross-sectional view of the conductive device of FIG. 9 along sectional line XI-XI;

FIG. 12 is a view of the filling port of a fitting housing with another embodiment of a conductive device;

FIG. 13 is a cross-sectional view of the conductive device of FIG. 12 along sectional line XIII-XIII;

FIG. 14 is a cross-sectional view of the conductive device of FIG. 12 along sectional line XIV-XIV;

FIG. 15 is a view of the filling port of a fitting housing with another embodiment of a conductive device;

FIG. 16 is a cross-sectional view of the conductive device of FIG. 15 along sectional line XVI-XVI;

FIG. 17 is a cross-sectional view of the conductive device of FIG. 15 along sectional line XVII-XVII;

FIG. 18 is a perspective view of another embodiment of a conductive device arranged in a filling port of a fitting housing;

FIG. 19 is a perspective view of another embodiment of a conductive device arranged in a filling port of a fitting housing;

DESCRIPTION OF THE PREFERRED EMBODIMENTS

Figure 1:
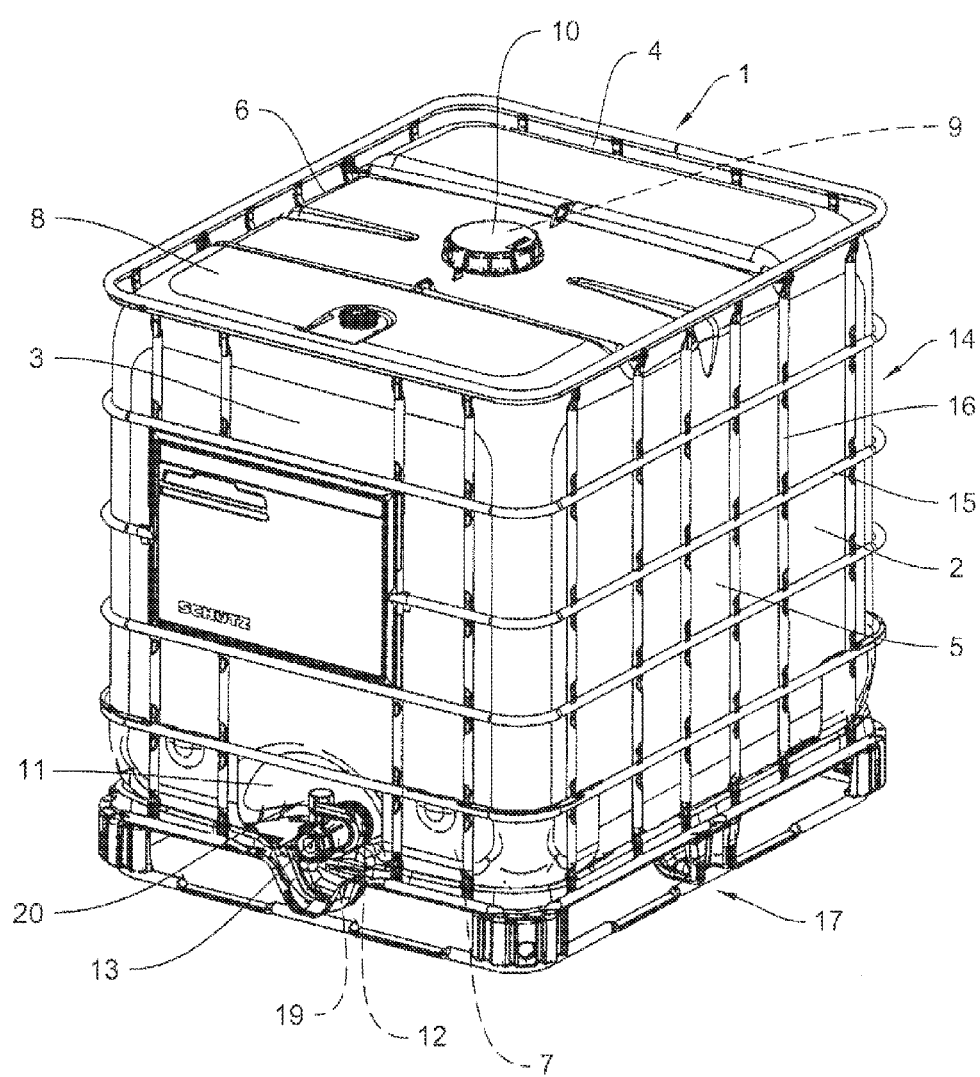
FIG. 1 is a perspective view of a transport and storage container for liquids.

Referring to the drawings, FIG. 1 shows a transport and storage container 1 usable for one-time and repeated storage of liquids and having a replaceable, cuboid inner container 2 made from plastic and with a front wall 3, a rear wall 4 and two side walls 5, 6, a lower horizontal surface 7 constructed as a draining base and an upper horizontal surface 8, a filling port 9 conformed therein and closable with a cap 10, and a drain spigot 12 conformed in a recess 11 in the bottom section of front wall 3. Drain spigot 12 is produced as a single part with inner container 2 in a blow molding process. Drain spigot 12 is used for attaching a tapping fitting 13, particularly a ball or flap cock. Inner container 2 is arranged inside an outer shell 14 which has a cage construction with metal cage bars 15, 16 intersecting horizontally and vertically, and is disposed on a pallet-like base 17.

Figure 2:
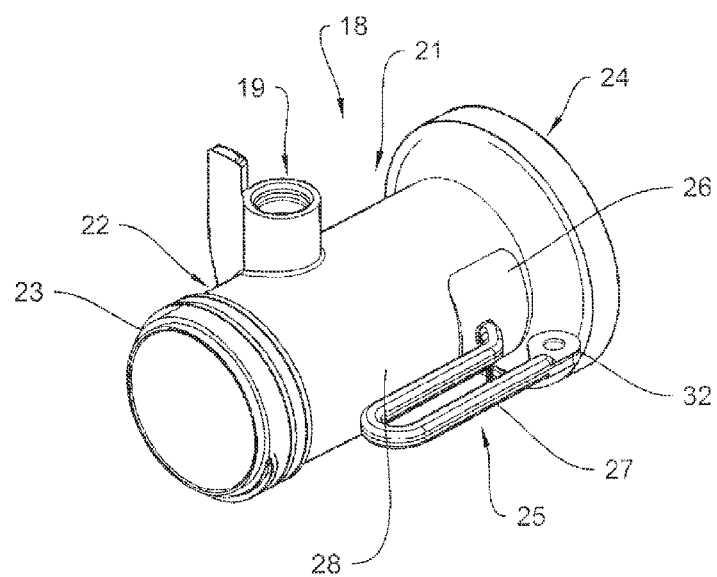
FIG. 2 is a perspective view of a tapping fitting with a conductive device arranged in a filling port of a fitting housing according to a first embodiment.

Tapping fitting 13 has a fitting housing 18, an exemplary embodiment of which is shown in FIG. 2, and which is preferably injection molded from a high-density polyethylene (PE-HD) and has a valve device 20 as shown in FIG. 1 with shutoff function in the central valve section 19, which separates a filling port 21 from a draining port 22, and in the version of the fitting housing 18 shown in FIG. 2 is furnished with a threaded end 23 for attaching a sealing cap, which is not shown in greater detail here.

As is also shown in FIG. 2, fitting housing 18 has a connection flange 24 designed as a weld flange on the end of filling port 21, and which is preferably joined to drain spigot 12 on inner container 2 by mirror welding.

Figures 3, 4, 5:
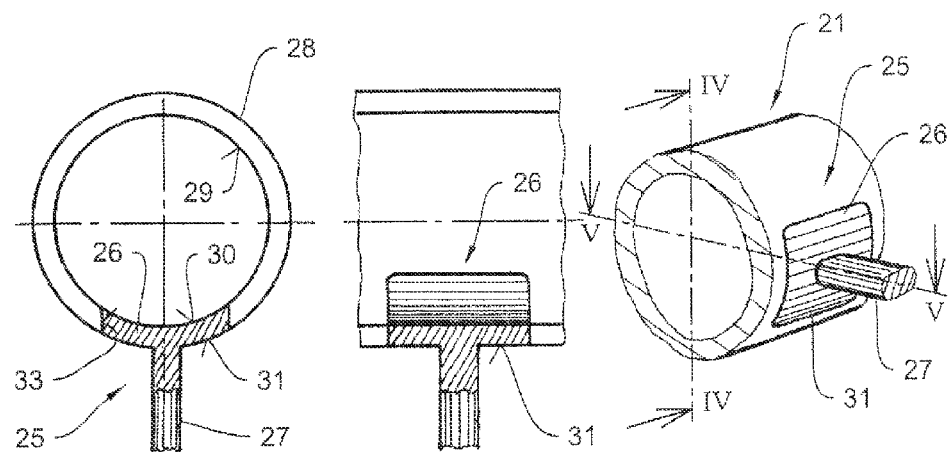
FIG. 3 is a view of the filling port of the fitting housing of FIG. 2.
FIG. 4 is a cross-sectional view of the conductive device of FIG. 3 along sectional line IV-IV.
FIG. 5 is a cross-sectional view of the conductive device of FIG. 3 along sectional line V-V.

Fitting housing 18 is manufactured in an injection molding process from an electrically non-conductive plastic such as polyethylene and has a conductive device 25 in the area of filling port 21, which device has a segment body, as shown in detail in FIGS. 3-5, on which an earthing conductor 27 is conformed integrally. Segment body 26 and earthing conductor 27 are made from an electrically conductive plastic such as polyethylene that is suffused with electrically conductive carbon nanoparticles. As may be seen particularly clearly in FIGS. 4 and 5, segment body 26 forms a wall segment of a channel wall 28 of filling port 21. In this context, a contact surface 30 arranged on an inner side 29 of channel wall 28 forms a direct transition surface between a liquid, not shown here, which is flowing along channel wall 28 or lying in contact with channel wall 28, and conductive device 25. On the outside of channel wall 28 of filling port 21 there is a connection surface 31 of segment body 26, which is adjoined by the integrally constructed earthing conductor 27. Because of the materially consistent connection between earthing conductor 27 and segment body 26, a particularly conductive electrical connection is created between contact surface 29 of segment body 26 and earthing conductor 27 or on a contact end 32 (FIG. 2) that is created in the present case by a mounting plate and a ground potential, which is not shown here.

The conductive device 25 shown in FIGS. 2 to 5 is manufactured with an injection molding machine according to 2K technology in such manner that fitting housing 18 with a cutout 33 in channel wall 28 in the area of filling port 21 is injection molded from an electrically non-conductive plastic material, for example high density polyethylene (PE-HD) in a first process step. Then, in a second process step an electrically conductive plastic material such as polyethylene suffused with carbon nanoparticles may be injected molded using the same injection molding machine onto the previously manufactured fitting housing 18 in the area of cutout 33 to manufacture conductive device 25 with earthing conductor 27 conformed integrally with segment body 26.

In FIGS. 6 to 8, an alternative conductive device 34 to the conductive device 25 shown in FIGS. 2 to 5 is shown, being integrated in a channel wall 35 of fitting housing 18 in the area of filling port 21. In the present case, channel wall 35 is constructed in such manner that it has cutouts 36 arranged radially about the circumference in the area of filling port 21, which cutouts are realized as elongated slots extending parallel to a longitudinal axis of flow axis 37. Cutouts 36 are also located in a base 38 of a seating 39 conformed to extend round the circumference of channel wall 35, in which conductive device 34 is disposed, in such manner that contacting extensions 41 conformed on a segment body 40 pass through channel wall 35 and are disposed with contact surfaces 42 on an inner side 43 of channel wall 35.

Segment body 40 and its connection surface 44, on which an earthing conductor 45 is disposed integrally, extends along an outside surface 46 of channel wall 35.

As was explained with reference to FIGS. 2 to 5, conductive device 34 is also constructed in channel wall 35 using 2K technology, so that channel wall 35 is produced in a first process step and conductive device 34 is injected into channel wall 35 a subsequent, second process step.

FIGS. 9 to 11 show another alternative embodiment in which a conductive device 47 is disposed on an inner side 48 of a channel wall 49. To this end, a seating 50 extending radially on the inner side 48 of channel wall 49 is provided, in which a segment body 51 of conductive device 47 is disposed in such manner that a contact surface 52 of segment body 51 is located on the inner side 48 and a connection surface 53 is arranged at the bottom 54 of the seating 50 formed in channel wall 49.

As is shown particularly clearly in FIGS. 10 and 11, an earthing conductor 54 is constructed so as to be connected integrally with connection surface 53, and passes through channel wall 49 to the outside.

As was described previously, the construction and arrangement of conductive device 47 in channel wall 49 is realized on the basis of 2K technology.

In FIGS. 12 to 14, a conductive device 56 is shown having a segment body 57 that forms a wall segment of a channel wall 58. For this purpose, channel wall 58 has a seating 59 in the form of a slot-like cutout in channel wall 58, which seating is completed by segment body 57. In this way, a contact surface 60 of segment body 57 on an inner side 61 of channel wall 58 and a connection surface 62 of segment body 57 forms a portion of an outer side 63 of channel wall 58.

In FIGS. 15 to 18, a conductive device 64 is shown having a segment body 65 that is constructed as an annular wall segment of a channel wall 66. This special design of conductive device 64 enables various production methods to be used to produce a correspondingly equipped fitting housing.

As is shown in FIGS. 15 to 17, conductive device 64 may be manufactured in an injection molding tool using 2K technology by first producing a first housing section 67 of a fitting housing 68 and then in a second step molding the conductive device onto the first section 67 as a second section of fitting housing 68.

Alternatively, as indicated in the illustration in FIG. 18, it is also possible first to create two housing sections 69, 70 of a fitting housing 71, and then to position conductive device 64, as shown in FIG. 18, coaxially between housing sections 69, 70 in order to create a materially consistent connection between conductive device 64 and housing sections 69, 70 in a welding process.

In a further embodiment, FIG. 19 shows a conductive device 72 that is connectable in materially consistent manner to a fitting housing 73 by a welded connection. FIG. 19 shows conductive device 72 immediately prior to welding with a rear connection end 86 of fitting housing 73. After the materially consistent connection has been created between conductive device 72 and fitting housing 73, conductive device 72 forms a welding flange for connection with the drain spigot 12 of inner container 2 shown in FIG. 1. Conductive device 72 is furnished with an annular segment body 74 with a contact surface 74 facing the longitudinal axis 37 of fitting housing 74 and an outer connection surface 75 on which an earthing conductor 77 is conformed as an integral extension of segment body 76.

Figures 20, 21, 22:
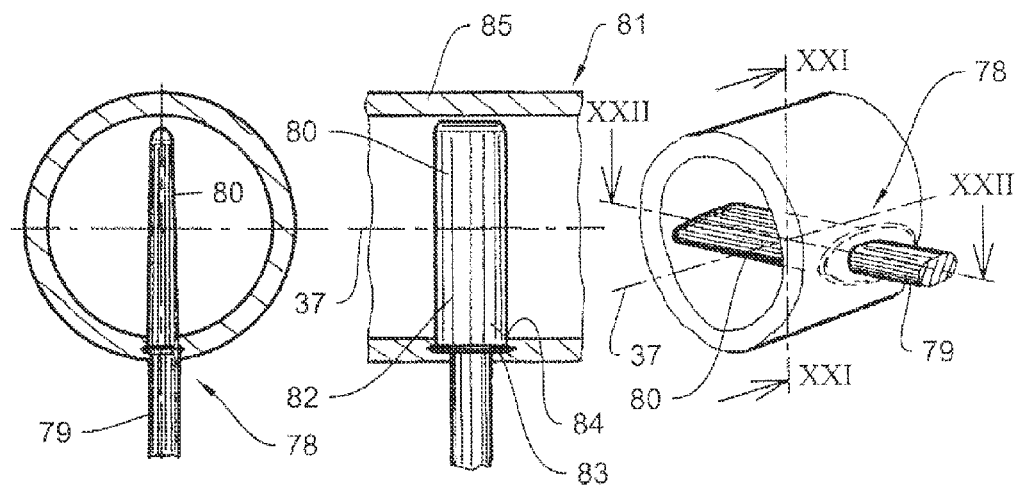
FIG. 20 is a perspective view of another embodiment of a conductive device arranged in a filling port of a fitting housing.
FIG. 21 is a cross-sectional view of the conductive device of FIG. 20 along sectional line XXI-XXI.
FIG. 22 is a cross-sectional view of the conductive device of FIG. 20 along sectional line XXII-XXII.

In FIGS. 20 to 22, a conductive device 78 is shown having a flow deflection body 80 conformed as the axial extension of an earthing conductor 79, which is disposed in the flow cross section of a channel wall 85 of fitting housing 81 transversely to the axis of flow 37 of a fitting housing 81. Flow deflection body 80 has a flow profile that is preferably designed such that when a liquid contained in the inner container 2 (FIG. 2) is tapped an essentially laminar flow of the liquid is created on a contact surface 82 of flow deflection body 80.

The fitting housing 81 shown in FIGS. 20 to 22 may preferably be produced together with conductive device 78 in a 2K process, wherein a bearing collar 83 may be created integrally on conductive device 78 in a transition area between conductive device 79 and flow deflection body 80, which collar is seated in positive locking manner in a mating recess 84 in channel wall 85 and ensures that conductive device 78 is immobilized axially and positioned securely on fitting housing 81 and channel wall 85.

While specific embodiments of the invention have been shown and described in detail to illustrate the application of the principles of the invention, it will be understood that the invention may be embodied otherwise without departing from such principles.

What is claimed is:

1. A tapping fitting, comprising:
a fitting housing comprising plastic for connection to a drain spigot of a plastic container for liquids, wherein the fitting housing is provided with a conductive device at least part of which is made from electrically conductive plastic for dissipating an electrostatic charge, wherein the conductive device has an integrally conformed earthing conductor for an electrically conductive connection of the conductive device to a ground potential, said conductive device being integrally connected with the fitting housing, wherein the conductive device has a flow deflection body configured as an axial extension of the earthing conductor, said fitting housing comprising a channel wall and a flow channel, the flow deflection body being disposed within and perpendicular to a lengthwise direction of the flow channel so that the deflection body is fully exposed in a free flow cross-section of the flow channel formed by the channel wall, said deflection body being integrally connected to said earthing conductor, wherein said deflection body and said earthing conductor define a single, unitary one-piece conductive structure, wherein the flow deflection body has a flow profile.

2. A tapping fitting in accordance with claim 1, wherein the plastic container is an interior container of a transport and storage container.

3. A tapping fitting in accordance with claim 1, wherein at least a portion of said earthing conductor is located at a position external to said fitting housing, at least another portion of said earthing conductor being arranged in an interior space of said fitting housing.

4. A tapping fitting in accordance with claim 1, wherein said fitting housing comprises an inner channel wall, said inner channel wall comprising a recess, said earthing conductor comprising a collar, said collar being arranged in said recess.

5. A tapping fitting in accordance with claim 1, wherein said fitting housing comprises an inner channel wall, said inner channel wall comprising a recess, said earthing conductor comprising a collar, wherein a positive lock connection is defined by said recess and said collar to fix said earthing conductor to said fitting housing.

6. A tapping fitting in accordance with claim 1, wherein said fitting housing comprises a channel wall having an inner channel wall surface and an outer channel wall surface, said inner channel wall surface defining said flow channel, said channel wall comprising a recess, said recess being located between said inner channel wall surface and said outer channel wall surface, said earthing conductor comprising a collar, wherein a positive lock connection is defined by said recess and said collar to fix said earthing conductor to said fitting housing, wherein said unitary, one-piece conductive structure is in a fixed position and said unitary, one-piece conductive structure does not move relative to said channel wall.

7. A transport and storage container for liquids, comprising:
an inner container made from plastic with a closable filling port and a drain spigot for connection of a tapping fitting;
a metal outer mantle and a subframe that is configured to enable handling using stacker trucks, storage and retrieval machines or similar transport means, said tapping fitting being connected to the drain spigot of the inner container, said tapping fitting comprising a fitting housing comprising plastic for connection to a drain spigot of a plastic container for liquids, wherein the fitting housing is provided with a conductive device at least part of which is made from electrically conductive plastic for dissipating an electrostatic charge, the conductive device having an integrally conformed earthing conductor for an electrically conductive connection of the conductive device to a ground potential, said conductive device being integrally connected with the fitting housing, wherein the conductive device has a flow deflection body configured as an axial extension of the earthing conductor, said fitting housing comprising a flow channel and a channel wall, the flow deflection body being disposed within and perpendicular to a lengthwise direction of the flow channel so that the deflection body is fully exposed in a free flow cross-section of the flow channel formed by the channel wall, said deflection body being integrally connected to said earthing conductor, wherein said deflection body and said earthing conductor define a unitary, one-piece conductive structure, wherein the flow deflection body has a flow profile.

8. A transport and storage container in accordance with claim 7, wherein at least a portion of said earthing conductor is located at a position external to said fitting housing, at least another portion of said earthing conductor being arranged in an interior space of said fitting housing.

9. A tapping fitting in accordance with claim 7, wherein said fitting housing comprises an inner channel wall, said inner channel wall comprising a recess, said earthing conductor comprising a collar, said collar being arranged in said recess.

10. A tapping fitting in accordance with claim 7, wherein said fitting housing comprises an inner channel wall, said inner channel wall comprising a recess, said earthing conductor comprising a collar, wherein a positive lock connection is defined by said recess and said collar to fix said earthing conductor to said fitting housing.

11. A tapping fitting in accordance with claim 7, wherein said fitting housing comprises a channel wall, said channel wall comprising an inner channel wall surface and an outer channel wall surface, said inner channel wall surface defining said flow channel, said channel wall comprising a recess, said recess being located between said inner channel wall surface and said outer channel wall surface, said earthing conductor comprising a collar, wherein a positive lock connection is defined by said recess and said collar to fix said earthing conductor to said fitting housing, wherein said unitary, one-piece conductive structure is in a fixed position and said unitary, one-piece conductive structure does not move relative to said channel wall.

12. A tapping fitting, comprising:
a fitting housing comprising plastic for connection to a drain spigot of a plastic container for liquids;
a conductive device comprising electrically conductive plastic for dissipating an electrostatic charge, said conductive device comprising an earthing conductor, said earthing conductor defining an electrically conductive connection element for connecting the conductive device to a ground potential, said conductive device being connected to said fitting housing, wherein said earthing conductor comprises an axial extent, said axial extent comprising a flow deflection body, said fitting housing comprising a channel wall, said channel wall defining a flow channel, said flow deflection body being disposed within said flow channel, said flow deflection body being perpendicular to a longitudinal axis of said flow channel, said flow deflection body having a flow profile, wherein each portion of said flow deflection body arranged within an interior of said flow channel is in contact with a flow of fluid passing through said flow channel, said flow deflection body being integrally connected to said earthing conductor, wherein said flow deflection body and said earthing conductor define a unitary, one-piece conductive structure.

13. A tapping fitting in accordance with claim 12, wherein the plastic container is an interior container of a transport and storage container.

14. A tapping fitting in accordance with claim 12, wherein at least a portion of said earthing conductor is located at a position external to said fitting housing, at least another portion of said earthing conductor being arranged in an interior space of said fitting housing.

15. A tapping fitting in accordance with claim 12, wherein said fitting housing comprises an inner channel wall, said inner channel wall defining a recess, said earthing conductor comprising a collar, said collar being arranged in said recess.

16. A tapping fitting in accordance with claim 12, wherein said fitting housing comprises an inner channel wall, said inner channel wall comprising a recess, said earthing conductor comprising a collar, wherein a positive lock connection is formed by said recess and said collar to fix said earthing conductor to said fitting housing.

17. A tapping fitting in accordance with claim 12, wherein said fitting housing comprises a channel wall having an inner channel wall surface and an outer channel wall surface, said inner channel wall surface defining said flow channel, said channel wall comprising a recess, said recess being located between said inner channel wall surface and said outer channel wall surface, said earthing conductor comprising a collar, wherein a positive lock connection is formed by said recess and said collar to fix said earthing conductor to said fitting housing, wherein said unitary, one-piece conductive structure is in a fixed position and said unitary, one-piece conductive structure does not move relative to said channel wall.

* * * * *